3,470,185
2-(PIPERAZINO)METHYL-2,3-DIHYDRO-
BENZOFURANS
Charles Ferdinand Huebner, Chatham, and Lincoln
Harvey Werner, Summit, N.J., assignors to Ciba
Corporation, Summit, N.J., a corporation of
Delaware
No Drawing. Continuation-in-part of application Ser. No.
644,793, June 9, 1967, which is a continuation of application Ser. No. 640,845, May 24, 1967, which in turn
is a continuation-in-part of application Ser. No. 580,-
880, Sept. 21, 1966. This application Mar. 18, 1968,
Ser. No. 714,057
Int. Cl. C07d 99/04, 51/72; A61k 27/00
U.S. Cl. 260—268       16 Claims

ABSTRACT OF THE DISCLOSURE 2-(4-arylpiperazino) - methyl-2,3-dihydrobenzofurans, e.g. those of the formula

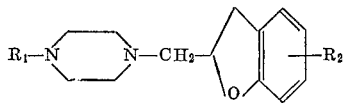

$R_1$=iso- or heterocyclic aryl
$R_2$=H, alkyl, alkoxy, alkylmercapto, halogen, $CF_3$ or alkanoyl quaternaries and salts thereof exhibit hypotensive effects.

CROSS-REFERENCES TO RELATED APPLICATIONS

This is a continuation-in-part of application Serial No. 644,793, filed June 9, 1967, which in turn is a continuation-in-whole of application Ser. No. 640,845, filed May 24, 1967, which in turn is a continuation-in-part of application Ser. No. 580,880, filed Sept. 21, 1966, which two latter applications are now abandoned.

SUMMARY OF THE INVENTION

The present invention concerns and has for its object the provision of new 2-(4-arylpiperazino)-methyl-2,3-dihydrobenzofurans, more particularly those of the Formula I

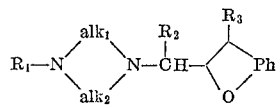

in which $R_1$ stands for an iso- or heterocyclic aryl radical, each of $alk_1$ and $alk_2$ for lower alkylene separating the nitrogen atoms by 2 carbon atoms, each of $R_2$ and $R_3$ for hydrogen or lower alkyl, and Ph for a 1,2-phenylene radical, quaternaries and salts thereof, corresponding pharmaceutical compositions and methods for the preparation of these products. Said compositions are useful as antihypertensives, for example, in the management and treatment of essential hypertension, vasospastic conditions and toxemia of pregnancy.

DESCRIPTION OF THE PREFERRED EMBODIMENTS

The aromatic radical $R_1$ in Formula I is preferably a monocyclic iso- or heterocyclic aryl radical, containing up to 2 heteroatoms, preferably nitrogen, oxygen and/or sulfur atoms, such as phenyl, pyridyl, furyl, thienyl, pyridazyl, pyrimidyl, pyrazinyl, oxazinyl or thiazinyl. These radicals are unsubstituted or substituted by one or more than one of the same or of different substituents attached to any of the positions available for substitution. Such substituents are, for example, lower alkyl, e.g. methyl, ethyl, n- or i-propyl or -butyl, etherified hydroxy or mercapto, such as lower alkoxy, alkylenedioxy or alkylmercapto, e.g. methoxy, ethoxy, n- or i-propoxy or -butoxy, methylenedioxy, methyl- or ethylmercapto, esterified hydroxy, such as halogeno, e.g. fluoro, chloro or bromo, trifluoromethyl, nitro or amino, particularly di-lower alkylamino, e.g. dimethylamino or diethylamino, or acyl, preferably lower alkanoyl, e.g. acetyl, propionyl or butyryl. Preferred aryl radicals $R_1$ are phenyl, (lower alkyl)-phenyl, (lower alkoxy)-phenyl, di-(lower alkoxy)-phenyl, (lower alkylenedioxy)- phenyl, (lower alkylmercapto)-phenyl, (halogeno)-phenyl, (trifluoromethyl)-phenyl, (nitro)-phenyl, (di-lower alkylamino)-phenyl, (lower alkanoyl)-phenyl, pyridyl, (lower alkyl)-pyridyl, furyl, (lower alkyl)-furyl, thienyl, (lower alkyl)-thienyl, pyridazyl, (lower alkyl)-pyridazyl, pyrimidyl, (lower alkyl)-pyrimidyl, pyrazinyl, (lower alkyl)-pyrazinyl, oxazinyl, (lower alkyl)-oxazinyl, thiazinyl or (lower alkyl)-thiazinyl.

The lower alkylene radicals $alk_1$ and $alk_2$, preferably stand for 1,2-ethylene, but also for 1,2-propylene, 1,2- or 2,3-butylene, 1,2- or 2,3-pentylene or 3,4-hexylene.

The radicals $R_2$ and $R_3$ represent preferably hydrogen, but also lower alkyl, e.g. that mentioned above.

The 1,2-phenylene radical Ph is unsubstituted or substituted as shown for the aryl radical $R_1$. It preferably corresponds to those unsubstituted or substituted phenyl radicals shown as the preferred embodiments of $R_1$.

Quaternaries are preferably lower alkyl- or aralkyl-quaternaries, e.g. the methyl-, ethyl-, propyl-, benzyl-, 1- or 2-phenylethyl-quaternaries.

The compounds of this invention exhibit valuable pharmacological properties. Apart from adrenergic blocking effects, they show primarily hypotensive activity, as can be demonstrated in animal tests using, for example mammals, such as dogs, as test objects. The compounds of the invention (for example dissolved or suspended in water) may be injected into the lumen of the small intestine of anesthetized, normotensive dogs or applied orally (by gelatin capsule) to unanesthetized, renal hypertensive dogs, in a dosage range between about 0.1 and 15 mg./kg./day, preferably between about 0.3 and 3 mg./kg./day, advantageously in a single dose between about 0.4 and 1.7 mg./kg./day. The unanesthetized dogs may receive these doses for several weeks, and their blood pressure is registered by insertion of a needle into the femoral artery, which needle is connected with a transducer and a kymograph. In the anesthetized dog a catheter is inserted into the femoral artery and a cannula into the trachea, and the blood pressure is analogously recorded for about 4 to 6 hours, during which time the drug is applied. Simultaneously or independently, the cardiac output, coronary, femoral, renal and/or mesenteric blood flow may be recorded, by placing the probe of an electromagnetic flow meter around the artery under investigation, which probe (and amplifier) also may be connected to a kymograph. Besides their above-mentioned utility, the compounds of this invention are also useful intermediates in the manufacture of other valuable, particularly pharmacologically active, products.

Particularly useful are compounds of the Formula I in which $R_1$ stands for phenyl, (lower alkyl)-phenyl, mono- or di-(lower alkoxy)-phenyl, (lower alkylmercapto)-phenyl, (halogeno)-phenyl, (trifluoromethyl)-phenyl, (lower alkanoyl)-phenyl, pyridyl or (lower alkyl)-pyridyl, each of $alk_1$ and $alk_2$ for 1,2-ethylene, each of $R_2$ and $R_3$ for hydrogen or methyl, and Ph for 1,2-phenylene, (lower alkyl)-1,2-phenylene, mono- or di-(lower alkoxy)-1,2-phenylene, (lower alkylmercapto)-1,2 - phenylene, (halogeno)-1,2-phenylene, (trifluoromethyl) 1,2-phenylene or (lower alkanoyl)-1,2-phenylene, and therapeutically useful acid addition salts thereof.

Especially valuable are compounds of the Formula II

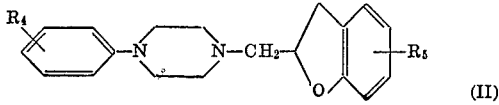

in which each of $R_4$ and $R_5$ stands for hydrogen, methyl, methoxy, chloro or acetyl, above all the racemic 1-(2-methoxy-phenyl) - 4 - (5-methoxy - 2,3 - dihydro-2-benzofuryl)-methyl-piperazine and its optically active d- and l-forms, as well as therapeutically useful acid addition salts of these compounds which, when applied orally or into a loop of the small intestine of normal or renal hypertensive dogs in a preferred dosage range between about 0.3 to 5 mg./kg./day, show outstanding hypotensive effects.

The compounds of this invention are prepared according to known methods. For example, the process for their preparation consists in:

(a) condensing compounds of the formulae

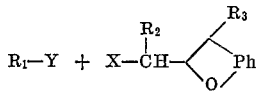

in which one of X and Y stands for reactively esterified hydroxy or bis-($\beta$-hydroxy-lower alkyl)-amino and the other for

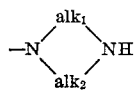

or primary amino, and both X and Y together contain 2 nitrogen atoms only, or (b) reacting compounds of the formulae

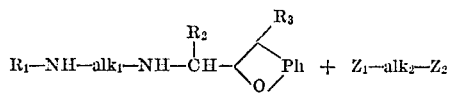

in which each of $Z_1$ and $Z_2$ stands for reactively esterified hydroxy, or (c) reducing in a compound of the formula

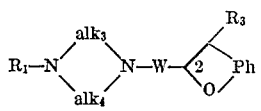

in which each of $alk_3$ and $alk_4$ is lower alkylene or alkanoylene and W is lower alkylidene, 1-hydroxy-alkylidene or carbonyl, or the 2-dehydro derivative thereof, which contains at least one carbonyl group in $alk_3$, $alk_4$ and W, a hydroxymethylidene group in W and/or a quaternary carbon atom in 2-position, said moieties to methylene or methylidene and, if desired, converting a resulting compound into another compound of the invention.

A reactive ester of the alcohols mentioned under items (a) and (b) is, for example, that of a mineral or sulfonic acid, e.g. sulfuric, methane, ethane, benzene or p-toluene sulfonic acid, but preferably that of a hydrohalic acid, e.g. hydrochloric or hydrobromic acid. A reactive ester of the phenols mentioned under items (a) is advantageously that of hydrofluoric or hydrochloric acid.

The above-mentioned reactions are carried out according to standard methods, in the presence or absence of diluents, preferably such as are inert to the reagents and are solvents thereof, of catalysts, condensing or reducing agents respectively and/or inert atmospheres, at low temperatures, room temperature or elevated temperatures, at atmospheric or superatmospheric pressure. Condensing agents are especially used in the reaction with said reactive esters in order to eliminate the acid formed.

They are basic agents, for example, alkali or alkaline earth metal carbonates or lower alkoxides, or organic nitrogen bases, such as pyridine or collidine, advantageously aliphatic tertiary amines, such as tri-lower alkylamines, e.g. triethylamine. The reduction of carbamoyl groups according to item (c) is preferably carried out with the use of complex light metal hydrides, such as alkali metal aluminum or borohydrides, e.g. lithium aluminum hydride, or by electrolytic reduction, whereas the elimination of a hydroxy group or double bond is advantageously carried out with hydrogen in the presence of hydrogenation, e.g. platinum or nickel, catalysts.

Resulting compounds may be converted into each other according to known methods. For example, any nitro group present may be reduced to the amino group or a nitro group may be introduced by nitration, e.g. the treatment with nitric acid under anhydrous conditions or the treatment of nitrates with strong acids, e.g. trifluoroacetic acid. Acyl groups may be introduced according to the Friedel-Crafts reaction, i.e. the treatment with acyl halides in the presence of aluminum chloride. A primary amino group present may be substituted with the use of corresponding reactive esters of alcohols or converted into another group accessible by the Sandmeyer replacement reaction, i.e. diazotization and replacement of the diazonium group formed, e.g. by hydroxy, when hydrolysis is applied, or by halogen when the halides or tetrafluoroborates are heated, advantageously in the presence of copper powder or cuprous halides. Tertiary amines obtained may be quaternized, for example, with the use of lower alkyl or aralkyl halides, e.g. the corresponding chlorides, bromides or iodides.

The compounds of the invention are obtained in the free form or in the form of their salts, depending on the conditions under which the process is carried out; the salts are also included in the present invention. Salts that are obtained can be converted into the free bases in known manner, for example, with alkalies or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicyclic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines mentioned under items (a) and (b) can be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods, e.g., analogous to those described in U.S. Patents Nos. 3,070,606, 3,200,132 and 3,365,453. For example, that used in reaction (a) is prepared by condensing a reactive ester of a 2 - (β,γ-dihydroxy-lower alkyl)-phenol in the presence of an alkali metal alkoxide or by reaction of an N-unsubstituted piperazine or bis-(β-haloalkyl)-amine with a reactive ester of a 2 - hydroxymethyl - 2,3 - dihydro-benzofuran. That used in reaction (b) by condensing an N-(β-haloalkyl)-aniline with a primary 2-aminomethyl - 2,3 - dihydrobenzofuran analogous to reaction (a). The starting material mentioned under item (c) is a prepared, for example, by reacting a 2-benzofuroyl or 1 - (2-benzofuryl)-lower alkyl halide or a 2-alkanoyl-benzofuran, or the 2,3-dihydro derivatives thereof, with a 1-aryl-piperazine or 1-aryl-mono- or dioxo-piperazine or the metal salts thereof.

Starting materials or final products that are mixtures of isomers, can be separated into the single isomers by methods in themselves known, e.g., by fractional distillation, crystallization and/or chromatography. Racemic products can likewise be resolved into the optical antipodes, for example by separation of diastereomeric salts thereof, e.g., by the fractional crystallization of d- or -tartrates, -nurlates, -mandelates or -camphor sulfonates.

The compounds of the invention can be used, for example, for the manufacture of pharmaceutical compositions containing them inconjunction or admixture with inorganic or organic, solid or liquid pharmaceutical excipients, suitable for enteral or parenteral administration. Suitable excipients are substances that do not react with the compounds of the invention, for example, water, gelatine, sugars, e.g., lactose, glucose, or sucrose, starches, e.g., corn starch or arrowroot, stearic acid or salts thereof, e.g., magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

The mixture of 5.0 g. 2 - bromomethyl - 5 - methoxy-2,3 - dihydrobenzofuran, 4.05 g. 1 - (2 - chlorophenyl)-piperazine, 3.0 g. anhydrous sodium carbonate and 20 ml. isopropanol is refluxed for 24 hours while stirring. After cooling, the mixture is filtered, the filtrate evaporated in vacuo, the residue dissolved in diethyl ether, the solution washed with water and extracted with 5% hydrochloric acid. The aqueous solution is chilled, the precipitate formed filtered off and recrystallized from ethanol to yield the 1-(2-chloro-phenyl)-4-(5 - methoxy-2,3-dihydro-2-benzofuryl-methylpiperazine hydrochloride of the formula

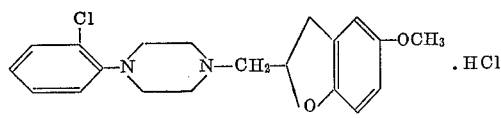

melting at 220–223°.

EXAMPLE 2

In the manner described in Example 1, the compounds listed below are prepared from equivalent amounts of the corresponding starting materials. In case the resulting product does not crystallize from the aqueous extract, it is isolated as follows: The acidic aqueous solution is made basic with sodium hydroxide, extracted with diethyl ether, the extract dried, filtered and evaporated. The residue, if necessary, is recrystallized as indicated to yield the free base. It is dissolved in ethanol, the solution acidified with ethanolic hydrochloric acid and the hydrochlorides so-obtained recrystallized, if necessary, from ethanol:

(a) 1-phenyl - 4 - (5 - methoxy - 2,3 - dihydro-2-benzofuryl)-methyl-piperazine, M.P. 115–117° (from isopropanol) its dihydrochloride melts at 234–235°, (b) 1-(2 - methyl-phenyl) - 4 - ( 5 - methoxy-2,3-dihydro - 2 - benzofuryl)-methyl-piperazine, its dihydrochloride melts at 228–230°, (c) 1-(2 - methoxy - phenyl) - 4 - (5 - methoxy-2,3-dihydro - 2 - benzofuryl)-methyl-piperazine, M.P. 81–85°, its dihydrochloride melts at 210–212°, (d) 1-(4 - methoxy-phenyl) - 4 - (5-methoxy-2,3-dihydro - 2 - benzofuryl)-methyl-piperazine, M.P. 90–94°, its dihydrochloride melts at 220–225°, (e) 1-(2,6 - dimethoxy-phenyl) - 4 - (5-methoxy-2,3-dihydro - 2 - benzofuryl)-methyl-piperazine, its dihydrochloride melts at 195–200°, (f) 1-(4 - chloro-phenyl) - 4 - (5 - methoxy-2,3-dihydro - 2 - benzofuryl)-methyl-piperazine, M.P. 100–104°, its dihydrochloride melts at 220–225°.

(g) 1-(2 - chloro-phenyl) - 4 - (5 - methyl - 2,3 - dihydro - 2 - benzofuryl)-methyl-piperazine, its hydrochloride melts at 215–219°.

EXAMPLE 3

The mixture of 5.1 g. 2 - bromomethyl - 5 - acetyl-2,3-dihydrobenzofuran, 5.9 g. 1 - phenyl-piperazine and 30 ml. ethanol is heated in a sealed tube at 150° for 4 hours. It is filtered, the filtrate evaporated, the residue dissolved in the minimal amount of ethyl acetate, the solution acidified with hydrogen chloride in ethyl acetate and the precipitate formed recrystallized from isopropanol to yield the 1-phenyl - 4 - (5 - acetyl - 2,3 - dihydro 2 - benzofuryl)-methyl-piperazine hydrochloride of the formula

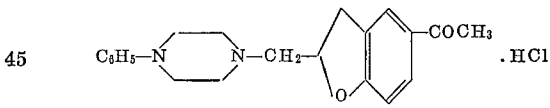

melting at 204–205°.

The starting material is prepared as follows: the mixture of 95.2 g. 4-hydroxy-acetophenone, 84.7 g. allyl bromide, 98.0 g. potassium carbonate and 150 ml. acetone is refluxed for 8 hours while stirring and allowed to stand overnight at room temperature. It is diluted with 1 liter water, extracted 3 times with 350 ml. diethyl ether, dried, filtered, evaporated, the residue distilled and the fraction boiling at 112–118°/0.7 mm. Hg collected; it represents the 4-allyloxy-acetophenone.

109 g. thereof are heated to 230–235° for 1½ hours under nitrogen. Hereupon 153 ml. acetic acid anhydride are added, the mixture refluxed for 3 hours, evaporated, the residue distilled and the fraction boiling at 123–125°/0.5 mm. Hg collected; it represents the 3-allyl-4-acetoxyacetophenone.

To the mixture of 103 g. thereof and 350 ml. carbon disulfide, 75.1 g. bromine are added at —5 to 0° during 2 hours. The mixture is evaporated in vacuo, the residue dissolved in 500 ml. diethyl ether and the solution allowed to stand for 2½ days in the refrigerator, to yield the 3-(2,3-dibromopropyl)-4-acetoxy-acetophenone, which is used without further purification.

To the solution of 179 g. thereof in 500 ml. ethanol, the solution prepared from 11.0 g. sodium and 475 ml. ethanol is added dropwise while stirring. The mixture is refluxed for 1 hour, then cooled, filtered, and the filtrate evaporated. The residue is taken up in 1 liter water, solution extracted with diethyl ether, the extract dried, filtered, evaporated and the fraction boiling at 170°/0.05 mm. Hg collected; it represents the 2-bromo-methyl-5-acetyl-2,3-dihydrobenzofuran.

In the analogous manner, the 2-brimomethyl-7-acetyl-2,3-dihydrobenzofuran, boiling at 147–150°/0.05 mm. Hg is obtained from 2-hydroxy-acetophenone.

EXAMPLE 4

The mixture of 5.1 g. 2-bromomethyl-7-acetyl-2,3-dihydrobenzofuran, 5.9 g. 1-phenyl-piperazine and 30 ml. ethanol is heated in a sealed tube to 150° for 4 hours. It is evaporated, the residue taken up in 200 ml. diethyl ether, the mixture filtered, the filtrate washed with water, dried, filtered and evaporated. The residue is dissolved in the minimal amount ethyl acetate, the solution acidified with hydrogen chloride in ethyl acetate and the precipitate formed recrystallized from ethanol to yield the 1-phenyl-4 - (7 - acetyl - 2,3 - dihydro - 2 - benzofuryl) - methyl - piperazine of the formula

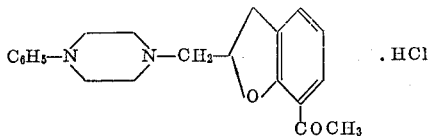

melting at 212–213°.

In the analogous manner, the following compounds are prepared from equivalent amounts of the corresponding starting materials:

(a) 1 - (2 - methyl - phenyl) - 4 - (7 - acetyl - 2,3 - dihydro - 2 - benzofuryl)-methyl-piperazine hydrochloride melting at 242–244°, (b) 1 - (3 - methyl - phenyl) - 4 - (7 - acetyl - 2,3 - dihydro - 2 - benzofuryl)-methyl-piperazine hydrochloride melting at 189–190°, (c) 1 - (2 - chloro - phenyl) - 4 - (7 - acetyl - 2,3 - dihydro - 2 - benzofuryl)-methyl-piperazine hydrochloride melting at 199–200°.

EXAMPLE 5

The mixture of 1.9 g. 2-aminomethyl-5-acetyl-2,3-dihydrobenzofuran, 2.0 g. N,N-bis-(2-chloroethyl)-aniline, 4.0 g. potassium carbonate and 50 ml. ethanol is refluxed overnight while stirring. It is filtered hot, the residue washed with ethanol and the filtrate evaporated in vacuo. The residue is taken up in ethyl acetate, the solution acidified with hydrogen chloride in ethyl acetate and the precipitate formed recrystallized from isopropanol to yield the 1 - phenyl - 4 - (5 - acetyl - 2,3 - dihydro-2-benzofuryl)-methyl-piperazine hydrochloride melting at 203–204°; it is identical with the product obtained according to Example 3.

The starting material is prepared as follows: The mixture of 2.55 g. 2-bromomethyl-5-acetyl-2,3-dihydrobenzofuran, 1.86 g. potassium phthalimide, one crystal potassium iodide and 10 ml. dimethylformamide is refluxed for 10 hours. It is poured onto ice, the mixture extracted with chloroform and the extract washed with aqueous potassium hydroxide, 0.5 N hydrochloric acid and water, dried and evaporated. The residue is taken up in a solution of 2 ml. hydrazine hydrate in 20 ml. methanol and the mixture refluxed for 3 hours. It is cooled, acidified with concentrated hydrochloric acid, again refluxed for 30 minutes and filtered. The filtrate is evaporated under reduced pressure, the residue taken up in water, the solution made basic with aqueous potassium hydroxide and extracted with diethyl ether. The extract is dried, filtered and evaporated to yield the 2-aminomethyl-5-acetyl-2,3-dihydrobenzofuran, which is used without further purification.

EXAMPLE 6

The mixture of 3.1 g. N-phenyl-N'-(7-acetyl-2,3-dihydro-2-benzofuryl)-methyl-ethylenediamine, 1.88 g. ethylenedibromide, 4.0 g. potassium carbonate, 10 ml. n-butanol and a drop of water is refluxed overnight while stirring. It is filtered hot, the residue washed with ethanol and the filtrate evaporated. The residue is taken up in ethyl acetate, the solution acidified with hydrogen chloride in ethyl acetate and the precipitate formed recrystallized from ethanol to yield the 1-phenyl-4-(7-acetyl-2,3-dihydro-2-benzofuryl)-methyl-piperazine melting at 210–212°; it is identical with the product obtained according to Example 4.

The starting material is prepared as follows: The mixture of 1.36 g. N-phenyl-ethylenediamine, 2.55 g. 2-bromomethyl-7-acetyl - 2,3 - dihydro-benzofuran and 15 ml. ethanol is kept in a sealed tube at the water bath for 10 hours. It is evaporated, the residue made basic with aqueous potassium hydroxide and extracted with benzene. The extract is dried and evaporated to yield the N-phenyl-N'-(7 - acetyl - 2,3 - dihydro - 2 - benzofuryl)-methyl-ethylene-diamine, which is used without further purification.

EXAMPLE 7

The solution of 16.2 g. 1-phenyl-4-(5-methoxy-2,3-dihydro - 2 - benzofuroyl)-piperazine in 100 ml. tetrahydrofuran is added dropwise to the mixture of 2.5 g. lithium aluminum hydride and 500 ml. tetrahydrofuran while stirring. The mixture is then refluxed overnight and after cooling 2.5 ml. water, 2 ml. 20% aqueous sodium hydroxide and 9 ml. water are added in this order. It is filtered, the filtrate evaporated and the residue recrystallized from isopropanol to yield the 1-phenyl-4-(5-methoxy-2,3 - dihydro - 2 - benzofuryl)-methyl-piperazine melting at 115–117°; it is identical with the product obtained according to Example 2(a).

EXAMPLE 8

The mixture of 6.17 g. 2-bromomethyl-7-methoxy-2,3-dihydro-benzofuran, 5.0 g. 1-(2-chloro-phenyl)-piperazine, 2.68 g. sodium carbonate and 30 ml. isopropanol is refluxed for 24 hours. After cooling, it is filtered, the residue washed with water, dried and recrystallized from ethanol to yield the 1-(2-chlorophenyl)-4-(7-methoxy-2,3-dihydro-2-benzofuryl)-methyl-piperazine of the formula

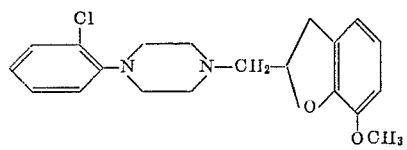

melting at 96–100°.

Its hydrochloride is obtained from a saturated ethanolic solution, acidified with ethanolic hydrochloric acid; it melts at 248–250°.

EXAMPLE 9

The mixture of 5.0 g. 2-bromomethyl-7-methoxy-2,3-dihydro-benzofuran, 4.0 g. 1-(2-methoxy-phenyl)-piperazine, 2.8 g. sodium carbonate and 30 ml. isopropanol is refluxed for 24 hours. It is cooled, filtered, and the residue washed with water. The filtrate is evaporated, the residue taken up in diethyl ether, the extract washed once with water and extracted with 5% aqueous hydrochloric acid. The aqueous solution is made basic with ammonia and extracted with diethyl ether. The extract is washed with water, dried, filtered and evaporated. The residue is acidified with ethanolic hydrochloric acid, the crystalline material filtered off and recrystallized from ethanol-diethyl ether, to yield the 1-(2-methoxy-phenyl)-4-(7-methoxy-2,3-dihydro-2-benzofuryl)-methyl-piperazine dihydrochloride of the formula

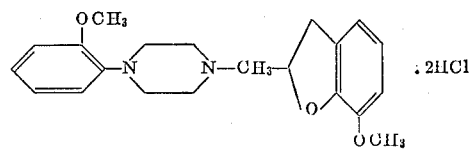

melting at 200–203°.

In the analogous manner the following compounds are prepared from equivalent amounts of the corresponding starting materials.

(a) 1 - (3 - methoxy-phenyl) - 4 - (5 - methoxy - 2,3 - dihydro - 2 - benzofuryl)-methyl-piperazine hydrochloride, M.P. 211–214° (from ethanol), (b) 1 - (3 - chloro-phenyl) - 4 - (5 - methoxy - 2,3 - dihydro-2-benzofuryl)-methyl-piperazine dihydrochloride, M.P. 213–214° (from ethanol) and (c) 1 - (2,5 - dimethoxy-phenyl) - 4 - (5 - methoxy - 2,3 - dihydro - 2 - benzofuryl)-methyl-piperazine hydrochloride, M.P. 182–190° (from ethanol-diethyl ether).

EXAMPLE 10

Preparation of 10,000 tablets each containing 50 mg. of the active ingredient.

Formula: Grams
1 - (2 - chloro-phenyl) - 4 - (5 - methoxy - 2,3 - dihydro - 2 - benzofuryl) - methyl - piperazine hydrochloride _____ 500.0
Lactose _____ 1,706.0
Corn starch _____ 90.0
Polyethylene glycol 6,000 _____ 90.0
Talcum powder _____ 90.0
Magnesium stearate _____ 24.0
Purified water, q.s.

Procedure:

All the powders are passed through a screen with an opening of 0.6 mm. Then the drug substance, lactose, talcum, magnesium stearate and half of the starch are mixed in a suitable mixer. The other half of the starch is suspended in 50 ml. water and the suspension added to the boiling solution of the polyethylene glycol in 50 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 11

Preparation of 160,000 tablets each containing 0.025 g. of the active ingredient.

Ingredients: Grams
1 - (2 - methoxy-phenyl) - 4 - (5 - methoxy - 2,3 - dihydro - 2 - benzofuryl)-methyl-piperazine dihydrochloride _____ 4,000.0
Lactose _____ 28,289.0
Corn starch _____ 3,410.0
Confectioners sugar _____ 2,800.0
Colloidal silica _____ 1,000.0
Stearic acid powder _____ 400.0
Calcium stearate _____ 100.0
Purified water, q.s.

Procedure:

The active ingredient, the lactose, 2,500.0 g. of the corn starch, the confectioners sugar and the colloidal silica are passed through a screen with 1 mm. openings into a mixer and blended at low speed for twenty minutes. The remainder of the corn starch is suspended in 1 liter cold water, and a paste is formed by gradually adding 4 liters of boiling water. The mixed powders are granulated with the above paste, using additional water as required. The resulting moist mass is passed through a screen with 4 mm. openings placed on trays and dried at 38° C. until the moisture content is between 2 and 3%. The granules are broken in a comminuting machine, knives forward, passed through a screen with 1 mm. openings and treated with the stearic acid and the calcium stearate, both screened through a screen with 0.8 mm. openings. After mixing for twenty minutes, the granulation is compressed into tablets using standard concave punches, uppers doubly scored.

EXAMPLE 12

The mixture of 5.0 g. 2-bromomethyl-5-methoxy-2,3-dihydro-benzofuran, 3.35 g. 1-(2-pyridyl)-piperazine, 3.0 g. sodium carbonate and 35 ml. isopropanol is refluxed for 24 hours. It is cooled, filtered, and the residue washed with water. The filtrate is evaporated, the residue taken up in diethyl ether, the extract washed once with water and extracted with 5% aqueous hydrochloric acid. The aqueous solution is made basic with ammonia and extracted with diethyl ether. The extract is washed with water, dried, filtered and evaporated. The residue is recrystallized from diethyl ether to yield the 1-(2-pyridyl)-4 - (5 - methoxy - 2,3 - dihydro - 2 - benzofuryl)-methyl-piperazine of the formula

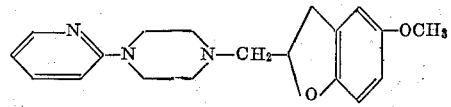

melting at 98–100°. Its dihydrochloride monohydrate melts at 260–263° with decomposition, after recrystallization from ethanol-diethyl ether.

EXAMPLE 13

To the solution of 5.68 g. 1-(2-methoxy-phenyl)-4-(5-methoxy - 2,3 - dihydro - 2 - benzofuryl) - methyl - piperazine (Example 2c) in 20 ml. hot ethanol, the solution of 2.4 g. d-tartaric acid in 40 ml. hot ethanol is added and the mixture allowed to stand in the refrigerator overnight. The precipitate formed is filtered off and recrystallized six times from ethanol, to yield the d-1-(2-methoxy-phenyl) - 4 - (5 - methoxy - 2,3 - dihydro - 2 - benzofuryl)-methyl-piperazine d-tartrate, melting at 148–153°, $[\alpha]_D^{25}=+18.9°$ (24.5 mg./ml. dimethylsulfoxide).

1.6 g. thereof are dissolved in the minimum amount of water, the solution made basic with aqueous ammonia and extracted with diethyl ether. The extract is dried, filtered and evaporated in vacuo, to yield the d-l-(2-methoxy - phenyl) - 4 - (5 - methoxy - 2,3 - dihydro - 2-benzofuryl)-methyl-piperazine, $[\alpha]_D^{25}=+36.2°$ (38 mg./ml. chloroform).

0.8 g. thereof are dissolved in the minimum amount of ethanol and the solution acidified with ethanolic hydrochloric acid. The precipitate formed is filtered off and recrystallized from water, to yield the d-l-(2-methoxy-phenyl) - 4 - (5 - methoxy - 2,3 - dihydro - 2 - benzofuryl)-methyl-piperazine hydrochloride of the formula

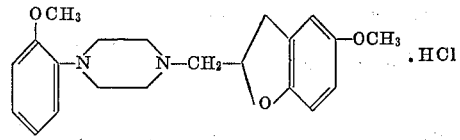

melting at 235–237°, $[\alpha]_D^{25}=+52.0°$ (17.6 mg./ml. dimethylsulfoxide).

EXAMPLE 14

To the solution of 2.34 g. 1-(2-methoxy-phenyl)-4-(5-methoxy - 2,3 - dihydro - 2 - benzofuryl) - methyl - piperazine, (Example 2c) in 10 ml. hot ethanol, the solution of 0.99 g. l-tartaric acid in 10 ml. hot ethanol is added and the mixture allowed to stand overnight in the refrigerator. The precipitate formed is filtered off and recrystallized twice from ethanol, to yield the l-1-(2-methoxy-phenyl) - 4 - (5 - methoxy - 2,3 - dihydro - 2 - benzofuryl)-methyl-piperazine l-tartrate, melting at 145–150°, $[\alpha]_D^{25}=-19.9°$ (23.3 mg./ml. dimethylsulfoxide).

0.5 g. thereof are dissolved in the minimum amount of water, the solution made basic with aqueous ammonia and extracted with diethyl ether. The extract is dried, filtered and evaporated in vacuo, to yield the l-1-(2-methoxy - phenyl) - 4 - (5 - methoxy - 2,3 - dihydro - 2-benzofuryl - methyl - piperazine, $[\alpha]_D^{25}=-35.7°$ (37.4 mg./ml. chloroform).

0.32 g. thereof is taken up in the minimum amount of ethanol and the solution acidified with ethanolic hydrochloric acid. The precipitate formed is filtered off and recrystallized from water, to yield the 1-1-(2-methoxyphenyl) - 4 - (5 - methoxy - 2,3 - dihydro - 2 - benzofuryl)-methyl-piperazine hydrochloride melting at 236–237°, $[\alpha]_D^{25} = -49.5°$ (23.3 mg./ml. dimethylsulfoxide).

EXAMPLE 15

The mixture of 32 g. 1-(2-methoxy-phenyl)-piperazine, 50 g. 2-bromomethyl-5-methoxy-2,3-dihydrobenzofuran, 24 g. sodium carbonate and 400 ml. isopropanol is refluxed for 48 hours while stirring. It is filtered, the filtrate evaporated in vacuo, the residue taken up in diethyl ether, the solution washed with water and extracted with 5% hydrochloric acid. The acidic solution is made basic with aqueous ammonia, the mixture extracted with diethyl ether, the extract dried, filtered and evaporated. The residue is dissolved in 100 ml. ethanol and the solution slightly acidified with 6 N ethanolic hydrochloric acid. The precipitate formed is filtered off and recrystallized from water, to yield the 1-(2-methoxy-phenyl)-4-(5-methoxy-2,3-dihydro-2-benzofuryl)-methyl-piperazine hydrochloride, melting at 225–227° with decomposition.

1 g. thereof is dissolved in 10 ml. 6 N-aqueous hydrochloric acid, 100 ml. acetone are added and the mixture allowed to stand in the refrigerator overnight. The precipitate formed is filtered off and recrystallized from ethanol-diethyl ether, to yield the corresponding dihydrochloride melting at 210–212°; it is identical with the product obtained according to Example 2(c).

EXAMPLE 16

The solution of 5 g. 1-(2-methoxy-phenyl)-4-(5-methoxy-2,3-dihydro-2-benzofuryl)-methyl-piperazine in 25 ml. warm ethanol is acidified with freshly prepared 4 N-ethanolic sulfuric acid. After cooling the precipitate formed is filtered off and recrystallized from 95% aqueous ethanol, to yield the corresponding disulfate melting at 195° with decomposition.

Allowing a 10% aqueous solution thereof to stand overnight in the refrigerator, the corresponding monosulfate separates, melting at 225–230° with decomposition.

EXAMPLE 17

To the solution of 1 g. 1-(2-methoxy-phenyl)-4-(5-methoxy - 2,3 - dihydro - 2 - benzofuryl) - methyl - piperazine in the minimal amount of ethanol, the saturated ethanolic solution of 1.5 g. cyclohexylsulfamic acid is added. The precipitate formed is filtered off and recrystallized from ethanol, to yield the corresponding dicyclohexylsulfamate melting at 138–141°.

EXAMPLE 18

Preparation of 10,000 tablets each containing 1.0 mg. of the active ingredient:

Formula: | Grams
--- | ---
d - 1 - (2 - methoxy - phenyl) - 4 - (5 - methoxy - 2,3 - dihydro - 2 - benzofuryl)-methyl-piperazine hydrochloride | 10.00
Lactose | 828.00
Corn starch | 50.00
Polyethylene glycol 6,000 | 50.00
Talcum powder | 50.00
Magnesium stearate | 12.00
Purified water, q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 25 ml. water and the suspension added to the boiling solution of the polyethylene glycol in 100 ml. water. The paste formed is added to the powders which are granulated, if necessary, with an additional amount of water. The granulate is dried overnight at 35°, broken on a screen with 1.2 mm. openings and compressed into tablets using flat punches with 4.8 mm. diameter, uppers bisected.

In the analogous manner, tablets with the levorotatory antipode are prepared.

EXAMPLE 19

Preparation of 10,000 tablets each containing 50.0 mg. of the active ingredient:

Formula: | Grams
--- | ---
1-(2-methoxy-phenyl) - 4 - (5-methoxy-2,3-dihydro - 2 - benzofuryl) - methyl-piperazine di-cyclohexylsulfamate | 500.00
Lactose | 1,706.00
Corn starch | 90.00
Polyethylene glycol 6,000 | 90.00
Talcum powder | 90.00
Magnesium stearate | 24.00
Purified water, q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 20

To the hot solution of 1.1 g. 1-(2-methoxy-phenyl)-4-(5-methoxy-2,3-dihydro - 2 - benzofuryl) - methylpiperazine (A) in 20 ml. ethanol, 0.6 g. citric acid in 10 ml. ethanol are added. The mixture is evaporated in vacuo, the residue triturated with diethyl ether, filtered off and dried in vacuo over phosphorus pentoxide to yield the corresponding citrate hemihydrate melting at 78–83°.

To the hot solution of 0.23 g. (A) in 2 ml. ethanol, 0.07 ml. 85% phosphoric acid are added followed by 2 ml. diethyl ether. The precipitate formed is filtered off and recrystallized from aqueous ethanol-diethyl ether to yield the corresponding diphosphate monohydrate melting at 159–163°.

To the hot solution of 0.12 g. (A) in 2 ml. ethanol, the solution of 0.035 g. maleic acid in 0.5 ml. ethanol is added and the mixture evaporated in vacuo. The residue is triturated with diethyl ether and filtered off to yield the corresponding maleate melting at 161–163°.

We claim:
1. A 2-(4-arylpiperazino)-methyl - 3,4 - dihydrobenzofuran having the formula

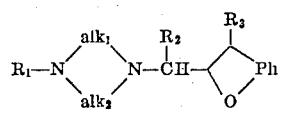

in which $R_1$ stands for phenyl, (lower alkyl)-phenyl, (lower alkoxy)-phenyl, di-(lower alkoxy)-phenyl, (lower alkyl-mercapto)-phenyl, (halogeno)-phenyl, (trifluoromethyl)-phenyl, (lower alkanoyl)-phenyl, pyridyl or (lower alkyl)-pyridyl, each of $alk_1$ and $alk_2$ for 1,2-ethylene or 1,2-propylene, each of $R_2$ and $R_3$ for hydrogen or methyl and Ph for 1,2-phenylene, (lower alkyl)-1,2-phenylene, mono- or di-(lower alkoxy)-1,2-phenylene, (lower alkylmercapto) - 1,2 - phenylene, (halogeno)-1,2-phenylene, (trifluoromethyl)-1,2-phenylene or (lower alkanoyl)-1,2-phenylene, or a therapeutically useful acid addition salt thereof.

2. A compound as claimed in claim 1 and having the formula

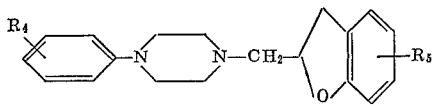

in which each of $R_4$ and $R_5$ stands for hydrogen, methyl, methoxy, chloro or acetyl, or a therapeutically useful acid addition salt thereof.

3. A compound as claimed in claim 1 and being the 1-(2-chloro-phenyl) - 4 - (5-methoxy - 2,3 - dihydro-2-benzofuryl)-methyl-piperazine or a therapeutically useful acid addition salt thereof.

4. A compound as claimed in claim 3 and being the 1-(2-chloro-phenyl) - 4 - (5-methoxy - 2,3 - dihydro-2-benzofuryl)-methyl-piperazine hydrochloride.

5. A compound as claimed in claim 1 and being the 1-(2-methoxy-phenyl) - 4 - (5-methoxy - 2,3 - dihydro-2-benzofuryl)-methyl-piperazine or a therapeutically useful acid addition salt thereof.

6. A compound as claimed in claim 5 and being the 1-(2-methoxy-phenyl) - 4 - (5-methoxy - 2,3 - dihydro-2-benzofuryl)-methyl-piperazine dihydrochloride.

7. A compound as claimed in claim 1 and being the 1-(2,6-dimethoxy-phenyl) - 4 - (5-methoxy - 2,3 - dihydro-2-benzofuryl)-methyl-piperazine or a therapeutically useful acid addition salt thereof.

8. A compound as claimed in claim 1 and being the 1-(2,5-dimethoxy-phenyl) - 4 - (5-methoxy - 2,3 - dihydro-2-benzofuryl)-methyl-piperazine or a therapeutically useful acid addition salt thereof.

9. A compound as claimed in claim 1 and being the 1-(2-pyridyl) - 4 - (5-methoxy - 2,3 - dihydro-2-benzofuryl)-methyl-piperazine or a therapeutically useful acid addition salt thereof.

10. A compound as claimed in claim 1 and being the 1-(2-chloro-phenyl) - 4 - (7-acetyl - 2,3 - dihydro-2-benzofuryl)-methyl-piperazine or a therapeutically useful acid addition salt thereof.

11. A compound as claimed in claim 1 and being the 1-phenyl - 4 - (7-acetayl - 2,3 - dihydro-2-benzofuryl)-methyl-piperazine or a therapeutically useful acid addition salt thereof.

12. A compound as claimed in claim 1 and being the 1-(2-methyl-phenyl) - 4 - (5-methoxy - 2,3 - dihydro-2-benzofuryl)-methyl-piperazine or a therapeutically useful acid addition salt thereof.

13. A compound as claimed in claim 1 and being the 1-(2-chloro-phenyl) - 4 - (7-methoxy - 2,3 - dihydro-2-benzofuryl)-methyl-piperazine or a therapeutically useful acid addition salt thereof.

14. A compound as claimed in claim 1 and being the 1-(2-methoxy-phenyl) - 4 - (7-methoxy - 2,3 - dihydro-2-benzofuryl)-methyl-piperazine or a therapeutically useful acid addition salt thereof.

15. A compound as claimed in claim 1 and being the levorotatory 1-(2-methoxy-phenyl) - 4 - (5-methoxy-2,3-dihydro-2-benzofuryl)-methyl-piperazine or a therapeutically useful acid addition salt thereof.

16. A compound as claimed in claim 1 and being the dextrorotatory 1-(2-methoxy-phenyl) - 4 - (5-methoxy-2,3-dihydro-2-benzofuryl)-methyl-piperazine or a therapeutically useful acid addition salt thereof.

References Cited

UNITED STATES PATENTS 3,189,600  6/1965  Huebner _____ 260—268

OTHER REFERENCES

Chou et al., Yao Hsueh Hsueh Pao, vol. 11, pp. 692–9 (1964). Abstracted in Chem. Abstr., vol. 62, col. 64856 (1965).

NICHOLAS S. RIZZO, Primary Examiner

D. A. DAUS, Assistant Examiner

U.S. Cl. X.R.

260—250, 256.4, 346.2, 513.6, 576, 592; 424—250

PO-1050
(5/69)

UNITED STATES PATENT OFFICE
CERTIFICATE OF CORRECTION

Patent No. 3,470,185      Dated September 30, 1969

Inventor(s) CHARLES FERDINAND HUEBNER ET AL

It is certified that error appears in the above-identified patent and that said Letters Patent are hereby corrected as shown below:

Column 3, line 17, after "0.3", delete "to" and substitute --- and ---;

line 65, "items" should read --- item ---.

Column 4, line 48, "4-aminosalicyclic" should read --- 4-aminosalicylic ---.

Column 5, line 13, after "(c) is", delete "a";

line 29, "inconjunction" should read --- in conjunction ---;

line 65, after "dro-2-benzofuryl" insert --- ) ---.

Column 10, line 74, after "benzofuryl", insert --- ) ---.

Column 14, line 2, "(7-acetayl" should read --- (7-acetyl ---.

SIGNED AND SEALED
DEC 15 1970

(SEAL)
Attest:

Edward M. Fletcher, Jr.
Attesting Officer

WILLIAM E. SCHUYLER, JR.
Commissioner of Patents